(12) United States Patent
Monna

(10) Patent No.: US 11,157,224 B2
(45) Date of Patent: Oct. 26, 2021

(54) INFORMATION PROCESSING APPARATUS FOR NOTIFYING STATUS OF A PERIODICALLY EXECUTED PROCESS AND NON-TRANSITORY COMPUTER READABLE MEDIUM

(71) Applicant: FUJIFILM Business Innovation Corp., Tokyo (JP)

(72) Inventor: Atsushi Monna, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/706,846

(22) Filed: Dec. 9, 2019

(65) Prior Publication Data

US 2020/0387334 A1 Dec. 10, 2020

(30) Foreign Application Priority Data

Jun. 7, 2019 (JP) .............................. JP2019-106782

(51) Int. Cl.
*G06F 3/12* (2006.01)

(52) U.S. Cl.
CPC .......... *G06F 3/1275* (2013.01); *G06F 3/1204* (2013.01); *G06F 3/1268* (2013.01); *G06F 3/1273* (2013.01)

(58) Field of Classification Search
CPC ....................................................... G06F 3/1275
USPC ......................................................... 358/1.15
See application file for complete search history.

(56) References Cited

U.S. PATENT DOCUMENTS

| | | | | |
|---|---|---|---|---|
| 2005/0243365 A1* | 11/2005 | Noda | ..................... | G06F 3/1288 358/1.15 |
| 2014/0211256 A1* | 7/2014 | Hosotsubo | ............ | G06F 3/1219 358/1.15 |
| 2019/0050177 A1* | 2/2019 | Hirai | ..................... | H04W 48/20 |

FOREIGN PATENT DOCUMENTS

| | | |
|---|---|---|
| JP | 5445124 | 3/2014 |
| JP | 2017079538 | 4/2017 |

\* cited by examiner

*Primary Examiner* — Jacky X Zheng
(74) *Attorney, Agent, or Firm* — JCIPRNET

(57) ABSTRACT

An information processing apparatus includes a memory that stores log information on a process serving as a monitoring target and performed in past, a generating unit that generates, by using the log information, periodicity information that identifies a time period within which the process is periodically executed, and a notifying unit that, if the process has not been executed within the time period as scheduled in accordance with the periodicity information generated by the generating unit, notifies that the process has not been executed.

15 Claims, 14 Drawing Sheets

FIG. 4

| FLOW ID | ACTIVITY ID | CONDITION | ACTIVITY ID | CONDITION | ACTIVITY ID | CREATOR |
|---------|-------------|-----------|-------------|-----------|-------------|---------|
| Flow 01 | ACTIVITY A  |           | ACTIVITY C  |           | ACTIVITY E  | xxx@abc.com |
| Flow 02 | ACTIVITY B  | CONDITION X | ACTIVITY D | CONDITION Y | ACTIVITY E | yyy@abc.com |

FLOW ID: Flow 01

FLOW ID: Flow 02

FIG. 7

| PROCESS END TIME | FLOW ID | JOB ID | ACTIVITY ID | PROCESS STATUS |
|---|---|---|---|---|
| 2019/2/27 17:00 | Flow 01 | Job 01 | ACTIVITY A | NORMALLY ENDED |
| 2019/2/27 17:01 | Flow 01 | Job 01 | ACTIVITY C | NORMALLY ENDED |
| 2019/2/27 17:01 | Flow 02 | Job 02 | ACTIVITY B | NORMALLY ENDED |
| 2019/2/27 17:02 | Flow 01 | Job 01 | ACTIVITY E | NORMALLY ENDED |
| 2019/2/27 17:02 | Flow 02 | Job 02 | ACTIVITY D | NORMALLY ENDED |
| 2019/2/28 16:55 | Flow 01 | Job 03 | ACTIVITY A | NORMALLY ENDED |
| 2019/2/28 16:56 | Flow 01 | Job 03 | ACTIVITY C | NORMALLY ENDED |
| 2019/2/28 16:57 | Flow 01 | Job 03 | ACTIVITY E | NORMALLY ENDED |
| 2019/3/01 17:07 | Flow 01 | Job 04 | ACTIVITY A | NORMALLY ENDED |
| 2019/3/01 17:08 | Flow 01 | Job 04 | ACTIVITY C | NORMALLY ENDED |
| 2019/3/01 17:09 | Flow 01 | Job 04 | ACTIVITY E | NORMALLY ENDED |

FIG. 9

| PERIODICITY ID | FLOW ID | ACTIVITY ID | TIME PERIOD START TIME | TIME PERIOD END TIME | MONTH | DAY | DAY OF THE WEEK | HOLIDAY | NUMBER OF ENTRIES |
|---|---|---|---|---|---|---|---|---|---|
| 001 | Flow 01 | ACTIVITY A | 16:25 | 17:37 | | | TUE/WED/THU | | 1 |
| 002 | Flow 01 | ACTIVITY C | 16:26 | 17:37 | | | TUE/WED/THU | | 1 |
| 003 | Flow 01 | ACTIVITY E | 16:27 | 17:37 | | | TUE/WED/THU | | 1 |
| 004 | Flow 02 | ACTIVITY B | 16:30 | 17:30 | | 27 | | | 1 |
| 005 | Flow 02 | ACTIVITY E | 16:30 | 17:30 | | 27 | | | 1 |

FIG. 10

| EXECUTION VERIFICATION START TIME | PERIODICITY ID |
|---|---|
| 17:30 | 004, 005 |
| 17:37 | 001, 002, 003 |

FIG. 11

| PROCESS END TIME | FLOW ID | JOB ID | ACTIVITY ID | PROCESS STATUS |
|---|---|---|---|---|
| 2019/2/27 17:00 | Flow 01 | Job 01 | ACTIVITY A | NORMALLY ENDED |
| 2019/2/27 17:01 | Flow 01 | Job 01 | ACTIVITY C | NORMALLY ENDED |
| 2019/2/27 17:02 | Flow 01 | Job 01 | ACTIVITY E | NORMALLY ENDED |
| 2019/2/28 16:55 | Flow 01 | Job 03 | ACTIVITY A | NORMALLY ENDED |
| 2019/2/28 16:56 | Flow 01 | Job 03 | ACTIVITY C | NORMALLY ENDED |
| 2019/2/28 16:57 | Flow 01 | Job 03 | ACTIVITY E | NORMALLY ENDED |
| 2019/3/01 17:07 | Flow 01 | Job 04 | ACTIVITY A | NORMALLY ENDED |
| 2019/3/01 17:08 | Flow 01 | Job 04 | ACTIVITY C | NORMALLY ENDED |
| 2019/3/01 17:09 | Flow 01 | Job 04 | ACTIVITY E | NORMALLY ENDED |

FIG. 12

FLOW JOB EXECUTION LOG INFORMATION OF FLOW ID "Flow 01"
AND ACTIVITY ID "ACTIVITY A"

| PROCESS END TIME | FLOW ID | JOB ID | ACTIVITY ID | PROCESS STATUS |
|---|---|---|---|---|
| 2019/2/27 17:00 | Flow 01 | Job 01 | ACTIVITY A | NORMALLY ENDED |
| 2019/2/28 16:55 | Flow 01 | Job 03 | ACTIVITY A | NORMALLY ENDED |
| 2019/3/01 17:07 | Flow 01 | Job 04 | ACTIVITY A | NORMALLY ENDED |

→ GENERATE PERIODICITY INFORMATION OF ACTIVITY ID "ACTIVITY A"

| PERIODICITY ID | FLOW ID | ACTIVITY ID | TIME PERIOD START TIME | TIME PERIOD END TIME | MONTH | DAY | DAY OF THE WEEK | HOLIDAY | NUMBER OF ENTRIES |
|---|---|---|---|---|---|---|---|---|---|
| 001 | Flow 01 | ACTIVITY A | 16:25 | 17:37 | | | TUE/WED/THU | | 1 |

# INFORMATION PROCESSING APPARATUS FOR NOTIFYING STATUS OF A PERIODICALLY EXECUTED PROCESS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-106782 filed Jun. 7, 2019.

BACKGROUND

(i) Technical Field

The present disclosure relates to an information processing apparatus and a non-transitory computer readable medium.

(ii) Related Art

Japan Patent No. 5445124 discloses a job flow management apparatus. The job flow management apparatus requests an executing device to execute multiple jobs forming a job flow by transferring the jobs to the executing device. When execution results of the jobs are received, the job flow management apparatus sequentially estimates start times of the jobs starting with the job that is the latest in the execution order, by using execution time estimated to execute each job and time restriction indicating time at which a specific job is to be executed. The estimated start time is compared with target execution time. If the comparison reveals a delay of a predetermined time or more, the job flow management apparatus issues an alert.

Japanese Unexamined Patent Application Publication No. 2017-079538 discloses a charging control apparatus. In the charging control apparatus, a time schedule of external charging is set and a user is notified of the time schedule. The charging control apparatus sets a reference time range by performing a statistical process on the time schedules for several days. On a day on which the set time schedule is included within the reference time range, the charging control apparatus reduces the frequency of notifications of the time schedules.

SUMMARY

Aspects of non-limiting embodiments of the present disclosure relate to providing an information processing apparatus that notifies in a manner free from user setting that a process to be periodically executed has not been executed with some reason.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The information processing apparatus includes a memory that stores log information on a process serving as a monitoring target and performed in past, a generating unit that generates, by using the log information, periodicity information that identifies a time period within which the process is periodically executed, and a notifying unit that, if the process has not been executed within the time period as scheduled in accordance with the periodicity information generated by the generating unit, notifies that the process has not been executed.

BRIEF DESCRIPTION OF THE DRAWINGS

Exemplary embodiment of the present disclosure will be described in detail based on the following figures, wherein:

FIG. 4 illustrates an example of flow information defining a flow job;

FIG. 7 illustrates an example of flow job execution log information stored on a log information memory when two types of flow jobs are executed;

FIG. 9 illustrates an example of periodicity information generated by the periodicity information generating unit;

FIG. 10 illustrates an example of execution verification information generated by a controller;

FIG. 11 illustrates job information in detail used to generate the periodicity information in FIG. 9;

FIG. 12 illustrates an example of the job information having flow ID "flow 01" generated in accordance with flow job execution log information;

DETAILED DESCRIPTION

Embodiment of the disclosure is described below with reference to the drawings.

The disclosure relates to a system that generates a workflow by using an application program (hereinafter referred to as app) selected from multiple apps that are prepared in advance. The disclosure is applicable to a system that notifies a user of the execution of a process.

The apps used in the disclosure are not limited to those running on a server or a personal computer (hereinafter referred to as PC), and may be an app that runs on an image forming apparatus.

The exemplary embodiment of the disclosure applied to a system including the image processing apparatus is described below. The disclosure is not limited to such a system. The disclosure is also applicable to an information processing system that performs a process by using an information processing apparatus, such as a server, PC, mobile terminal apparatus, or tablet terminal apparatus.

Figure 1:
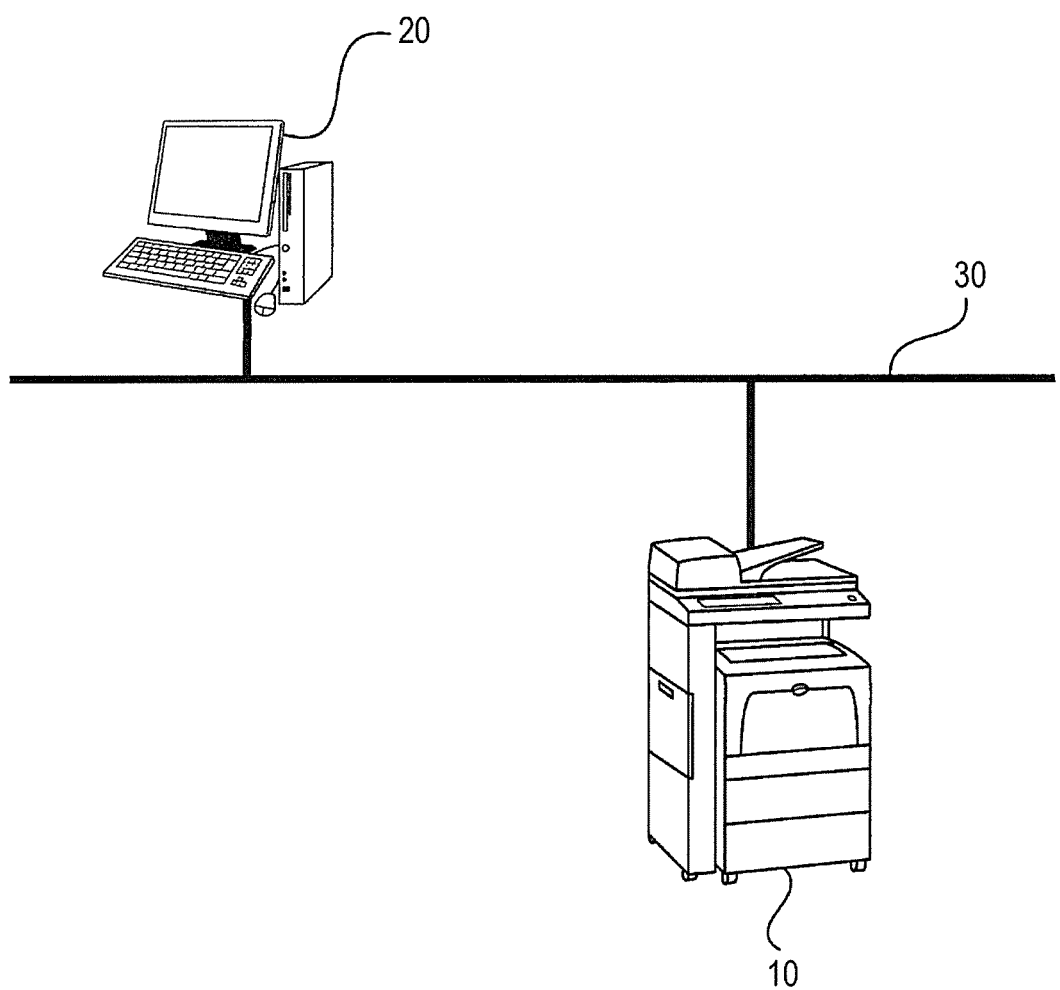
FIG. 1 illustrates a configuration of an image forming system of an exemplary embodiment of the disclosure.

FIG. 1 illustrates a configuration of an image forming system of an exemplary embodiment of the disclosure.

Referring to FIG. 1, the image forming system of the exemplary embodiment of the disclosure includes an image forming apparatus 10 and terminal device 20 interconnected to each other via a network 30. The terminal device 20 generates print data and transmits the generated print data to the image forming apparatus 10 via the network 30. Upon receiving the print data from the terminal device 20, the image forming apparatus 10 outputs onto a paper sheet an image responsive to the print data. The image forming apparatus 10 is a multi-function apparatus having multiple functions including a print function, scan function, copy function, and fax function.

The image forming apparatus 10 of the exemplary embodiment has a function that allows the image forming apparatus 10 to perform not only a variety of jobs including a copy operation and a fax transmission operation but also a flow job including multiple jobs.

The term flow job (also referred to as a flow process) means a process in which multiple operations are sequentially performed in accordance with a predetermined order.

The flow job is typically used to perform a fixed process that is periodically repeated. For example, at the end of each month, bills are sent to multiple destinations registered in advance and copies of the bills are stored in a particular confidential box. Such a process is periodically repeated. The flow job is used in such a process.

To monitor the flow job to make sure that the flow job has been normally executed, simply verifying the normal process results may not be sufficient in some cases.

For example, in a ticket gate notification service different from an image forming process, the passage of a child through a ticket gate may be detected and the parents of the child may be notified of the passage of the child. The service is triggered when the passage of the child is detected. A process of transmitting an email to a predetermined address may be performed. In order to verify that the process is normally executed in the ticket gate notification service, simply verifying the execution of the process in an error free manner to the normal ending is not sufficient to detect a problem.

If a child has not passed through the ticket gate for some reason, the service is not triggered and a process subsequent to the service is not performed. A failure to perform the process that is supposed to be normally performed is not detected. If a user attempts to detect the failure, a time period within which the process supposed to be periodically performed is to be compared with the presence or absence of process results.

Such a periodical or regular process may be different in terms of the degree of complexity depending on the process to be monitored. For example, if a child passing through a ticket gate is a monitoring target, the passage time of the child through the ticket gate may be different depending the end time of a class of his or her school, and the day of the week. The passage time of the child may be completely different depending on whether it is a weekend or weekday.

For example, a child may pass the ticket gate in the same time band for a while. When as the child passes to the next grade, the time band in which the child passes the ticket gate may possibly change.

It is time consuming for the user to beforehand set the time band for the process to be executed.

In a manner free from a user setting, the image forming apparatus 10 configured described below may notify the user that a process supposed to be periodically executed has not been executed for some reason.

Figure 2:
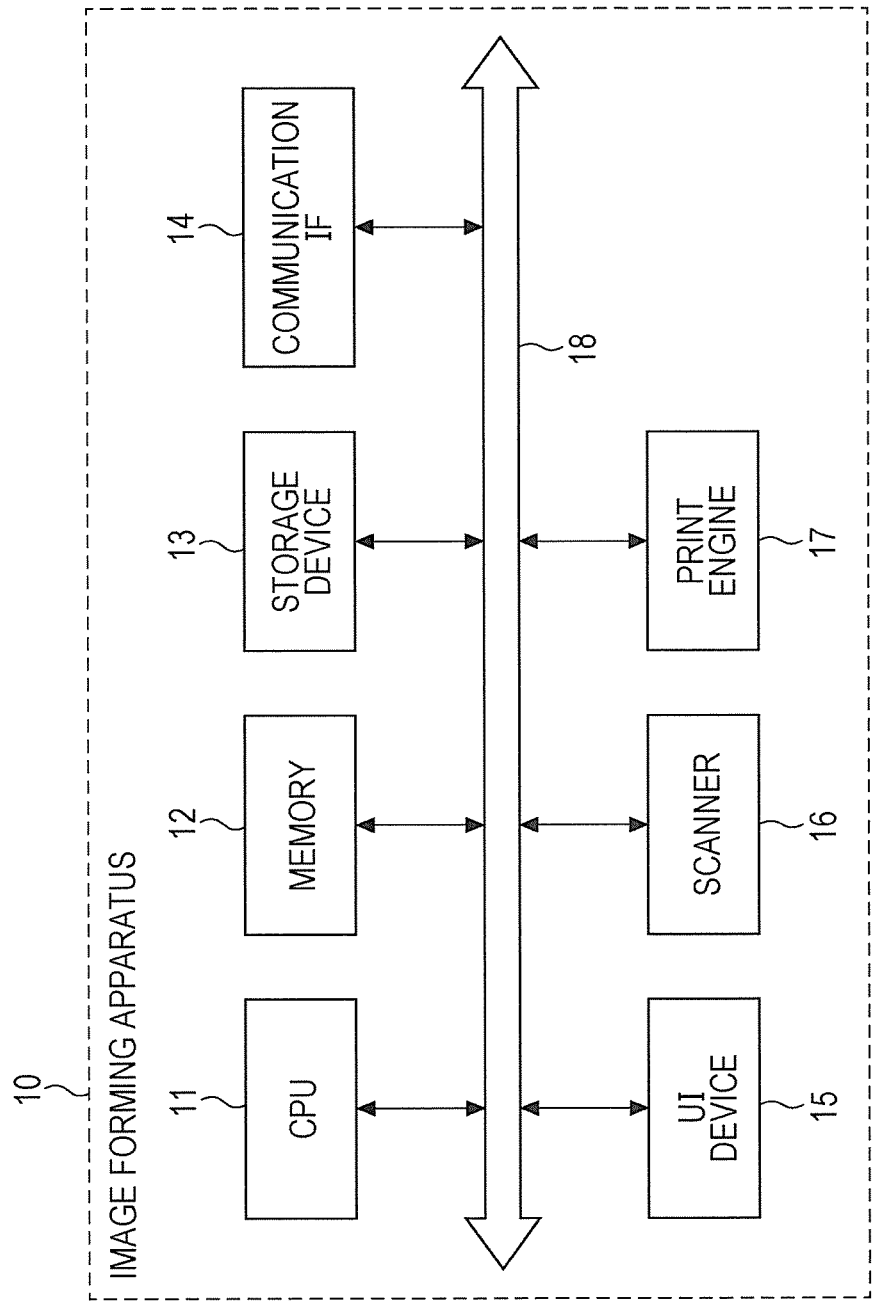
FIG. 2 is a block diagram illustrating a hardware configuration of an image forming apparatus of the exemplary embodiment of the disclosure.

FIG. 2 is a block diagram illustrating a hardware configuration of the image forming apparatus 10 in an image forming system of the exemplary embodiment of the disclosure.

The image forming apparatus 10 in FIG. 2 includes a central processing unit (CPU) 11, memory 12, storage device 13, such as a hard disk drive, communication interface (IF) 14 that transmits data to or receives data from an external device via the network 30, user interface (UI) device 15 including a touch panel or a liquid-crystal display and a keyboard, scanner 16, and print engine 17. These elements are interconnected via a control bath 18.

The print engine 17 prints an image on a recording medium, such as printing paper, via charging, exposure, development, transfer, and fixing steps.

The CPU 11 performs a predetermined process in accordance with a control program stored on the memory 12 or the storage device 13 and thus controls the operation of the image forming apparatus 10. In accordance with the exemplary embodiment, the CPU 11 reads the control program from the memory 12 or the storage device 13 and executes the read program. Alternatively, the control program may be provided to the CPU 11 in a stored form on a recording medium, such as a compact disk read-only memory (CD-ROM).

Figure 3:
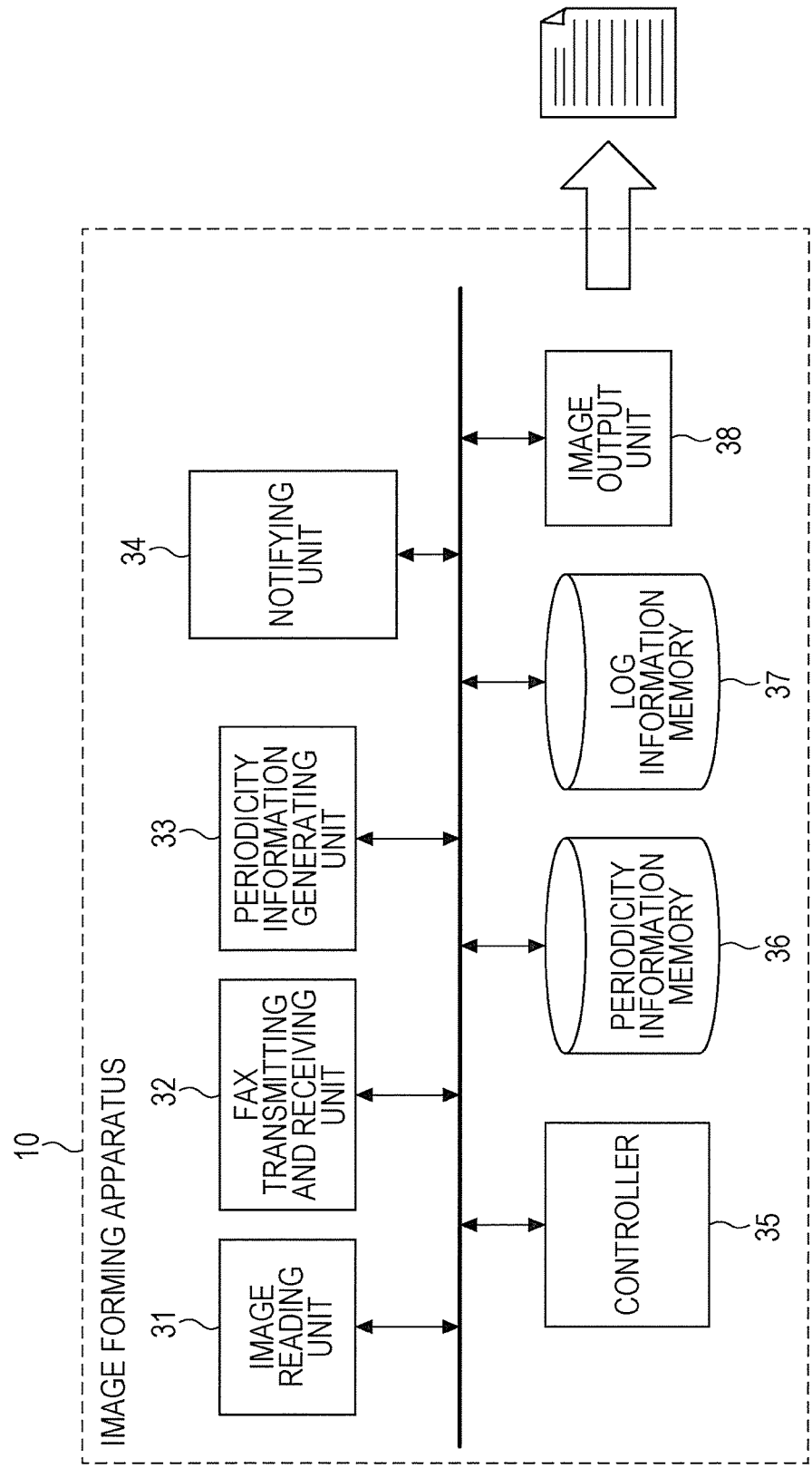
FIG. 3 is a functional block diagram illustrating the image forming apparatus of the exemplary embodiment of the disclosure.

FIG. 3 is a functional block diagram illustrating the image forming apparatus 10 that is implemented when the control program is executed.

Referring to FIG. 3, the image forming apparatus 10 of the exemplary embodiment includes an image reading unit 31, fax transmitting and receiving unit 32, periodicity information generating unit 33, notifying unit 34, controller 35, periodicity information memory 36, log information memory 37, and image output unit 38.

The image reading unit 31 performs an operation of reading a document image and converting the document image into image data. The fax transmitting and receiving unit 32 performs an operation of transmitting the image data to a specified destination via a telephone network and an operation of receiving incoming image data.

The image output unit 38 under the control of the controller 35 outputs an image on a recording medium, such as printing paper.

The controller 35 controls the image reading unit 31, fax transmitting and receiving unit 32, and image output unit 38 to perform a variety of operations, including a copying operation, fax transmission and reception operation, printing operation, and other operations.

The log information memory 37 stores flow job execution log information that is log information about the past execution of a flow job as a process as a monitoring target.

By using the log information stored on the log information memory 37, the periodicity information generating unit 33 generates periodicity information that identifies a time period within which the flow job as the monitoring target is periodically (or regularly) executed.

For example, the periodicity information generating unit 33 generates the periodicity information by performing a statistical process on the log information stored on the log information memory 37.

Specifically, in accordance with time and date information in the log information stored on the log information memory 37 with the time and date information being on time and date on which each process has been executed, the periodicity information generating unit 33 generates the periodicity information by identifying a combination of at least one or more pieces of information on a time band within which the process is to be executed, a date on which the process is to be executed, a day of week on which the process is to be executed, and an execution count of processes to be executed during the time period.

The periodicity information memory 36 stores the periodicity information generated by the periodicity information generating unit 33.

The notifying unit 34 references the periodicity information generated by the periodicity information generating unit 33 and stored on the periodicity information memory 36. If the process as a monitoring target has not been executed within a time period set in the periodicity information, the notifying unit 34 notifies a predetermined destination that the process has not been executed within the time period.

If the flow job as the monitoring target has not been executed within the time period identified by the periodicity information, the notifying unit 34 notifies the predetermined destination subsequent to the end of the time period that the flow job as the monitoring target has not been executed.

If the flow job as the monitoring target has been executed outside the time period identified by the periodicity information, the notifying unit 34 may also notify the predetermined destination that the flow job as the monitoring target has been executed outside the time period.

In accordance with the exemplary embodiment, the process to be monitored is described with reference to a flow job that is a flow process in which multiple operations are performed in a predetermined sequential order. The process to be monitored may be a process other than the flow job.

If the flow job is a process to be monitored, the periodicity information generating unit 33 generates the periodicity information for each of the operations forming the flow job.

Since the log information stored on the log information memory 37 is updated with the flow job executed, the periodicity information generating unit 33 generates the periodicity information every predetermined time period in accordance with the log information stored on the log information memory 37. The periodicity information generating unit 33 then updates the periodicity information stored on the periodicity information memory 36.

The process performed by the image forming apparatus 10 of the exemplary embodiment is described in detail below with reference to the drawings.

In the following discussion, two flow jobs indicated by flow information in FIG. 4 are processes to be monitored. Referring to FIG. 4, activities that are operations forming each flow job are represented by activity IDs, such as activity A through activity E.

The flow information defines the sequential order of activities as operations performed on each flow job and a condition to perform each activity.

The flow information in FIG. 4 lists two flow jobs identified by flow IDs "flow 01" and "flow 02". The flow job identified by the flow ID "flow 01" is defined such that the activity A is executed, sequentially followed by two operations of activity C and activity E.

The flow job identified by the flow ID "flow 02" is defined such that if a condition X is satisfied with the activity B executed, the operation as the activity D is then executed and such that if a condition Y is satisfied, the operation as the activity E is performed.

Figure 5:
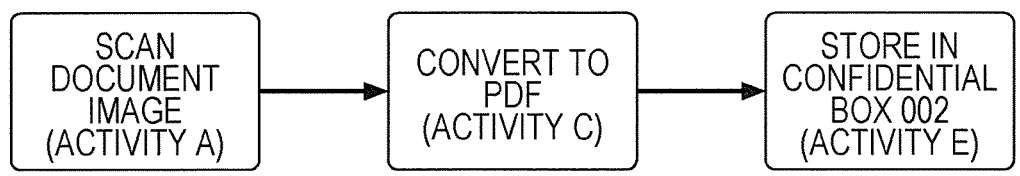
FIG. 5 illustrates an example of a flow job having a flow identification (ID) "flow 01"

FIG. 5 illustrates a specific example of the flow job having the flow ID "flow 01".

Referring to FIG. 5, if the activity A to "scan document image" is executed in the flow job identified by the flow ID "flow 01", the activity C to "convert to PDF" is executed. The activity E to "store in confidential box 002" is then executed.

Figure 6:
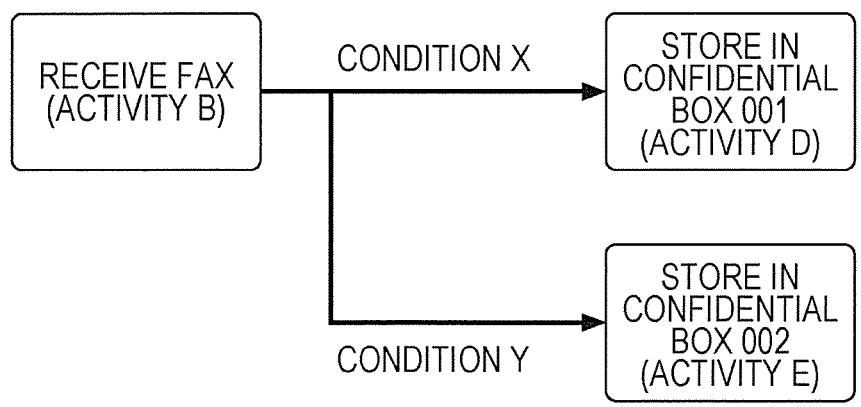
FIG. 6 illustrates an example of a flow job having a flow ID "flow 02"

FIG. 6 illustrates a specific example of the flow job identified by the flow ID "flow 02".

In the flow job identified by the flow ID "flow 02" in FIG. 6, the activity B to "receive fax" is executed. The activity D to "store in confidential box 001" is executed if a condition X that a sender telephone number is "045-123-4567" is satisfied. If a condition Y that the sender telephone number is "03-987-6543" is satisfied, the activity E to "store in confidential box 002" is executed.

FIG. 7 illustrates the flow job execution log information that is stored on the log information memory 37 when the two types of flow jobs are executed.

The flow job execution log information in FIG. 7 includes on a per activity basis a process end time, flow ID, job ID, activity ID, and process status.

The flow ID indicates whether the type of the flow job with each activity executed is "flow 01" or "flow 02". Each time a flow job is executed, the flow job is automatically designated with a serial job ID like "job 01", "job 02", "job 03", "job 04", .... The same flow jobs have the same job ID. If an activity is normally ended, "normally ended" is set in the process status. If an error is created during the process, "abnormally ended" is set in the process status.

Figure 8:
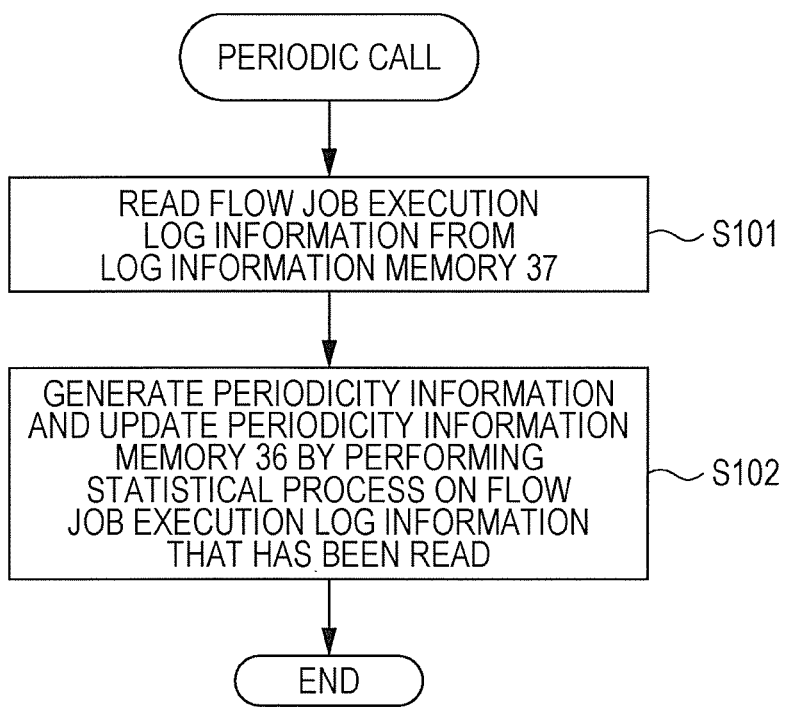
FIG. 8 is a flowchart illustrating a generation and update process that a periodicity information generating unit performs on the periodicity information in accordance with the flow job execution log information.

FIG. 8 is a flowchart illustrating a generation and update process that the periodicity information generating unit 33 performs on the periodicity information in accordance with the flow job execution log information.

In step S101, the periodicity information generating unit 33 reads the flow job execution log information stored on the log information memory 37 in response to a periodic call performed by the controller 35.

In step S102, the periodicity information generating unit 33 generates the periodicity information by performing a statistical process on the read flow job execution log information and updates the periodicity information stored on the periodicity information memory 36.

FIG. 9 illustrates an example of the periodicity information thus generated by the periodicity information generating unit 33.

The periodicity information in FIG. 9 includes information on a periodicity ID, flow ID, activity ID, time period start time and time period end time identifying a time period within which the process is periodically executed, month, day of the month, and day of the week. The number of entries in the periodicity information indicates the number of activities executed during the time period and is normally one.

The periodicity information identified by a periodicity ID 001 indicates that the activity A as one operation is executed as part of the flow job identified by the flow ID "flow 01" within the time period from 16:25 to 17:37 on Tuesdays, Wednesdays, and Thursdays.

In accordance with the periodicity information thus generated, the controller 35 generates execution verification information that is used to verify that the flow job has been executed within the same time period as usual.

FIG. 10 illustrates an example of the execution verification information thus generated.

In the execution verification information in FIG. 10, an execution verification start time is set at each periodicity ID. Specifically, the period end time of each piece of the periodicity information is set to be the execution verification start time. The execution verification start time is set to be the time when a determination as to whether the activity has been executed within the time period set as the periodicity information becomes possible.

The controller 35 performs an execution verification operation in accordance with the execution verification information. At the execution verification start time, the controller 35 verifies whether the activity to be monitored has been executed within the time period identified by the periodicity information having the periodicity ID corresponding to the execution verification start time.

The generation of the periodicity information in FIG. 9 is described with reference to FIG. 11.

When the periodicity information is generated in accordance with the flow job execution log information stored on the log information memory 37, the periodicity information generating unit 33 generates job information that is a list used to perform the statistical process.

The job information is used to perform the statistical process. The execution log information of a predetermined number of pieces from the latest piece backward on each flow job is stored.

If a new flow job is executed, the latest information is acquired from flow job execution log information and the job information is then updated.

FIG. 12 illustrates an example of the job information having flow ID "flow 01" generated in accordance with the flow job execution log information.

The statistical process is performed on a per flow ID basis and on a per activity ID basis. For example, there are three latest jobs, each having a flow ID "flow 01" and an activity ID "activity A". The three jobs have respectively process end times 2019/2/27 17:00, 2019/2/28 16:55, and 2019/3/01 17:07.

Concerning the jobs having the flow ID "flow 01" and the activity ID "activity A", the periodicity information generating unit 33 generates the periodicity information in FIG. 12.

Since the process end times of execution logs of the three jobs are varied within 30 minutes, the time period start time is set to be 16:25 that is 30 minutes earlier than the earliest process end time of 16:55.

Since the process end times of execution logs of the three jobs are varied within 30 minutes, the time period end time is set to be 17:37 that is 30 minutes later than the latest process end time of 17:07.

The month column is left blank because the execution log is present both in February and March.

The day column is left blank because the execution log is present both on February 27, and 28, and March 1.

Since calendar information indicates that the execution log is present on Tuesday, Wednesday, and Thursday, information "Tue/Wed/Thu" is set in the "day of the week" column.

Since the calendar information indicates that none of 27 and 28, February, and 1, March is holiday, the "holiday" column is left blank.

Since the number of jobs executed during the set time period is one, one is set in the "number of entries".

The statistical process determines the amount of the flow job execution log information that is used for the periodicity information generating unit 33 to generate effective periodicity information. For example, the flow job execution log information of at least one month is used for a job that is daily executed. However, concerning a job that is executed several times a week or a month, a target time period for collecting the flow job execution log information does not necessarily have to be so long.

Figure 13:
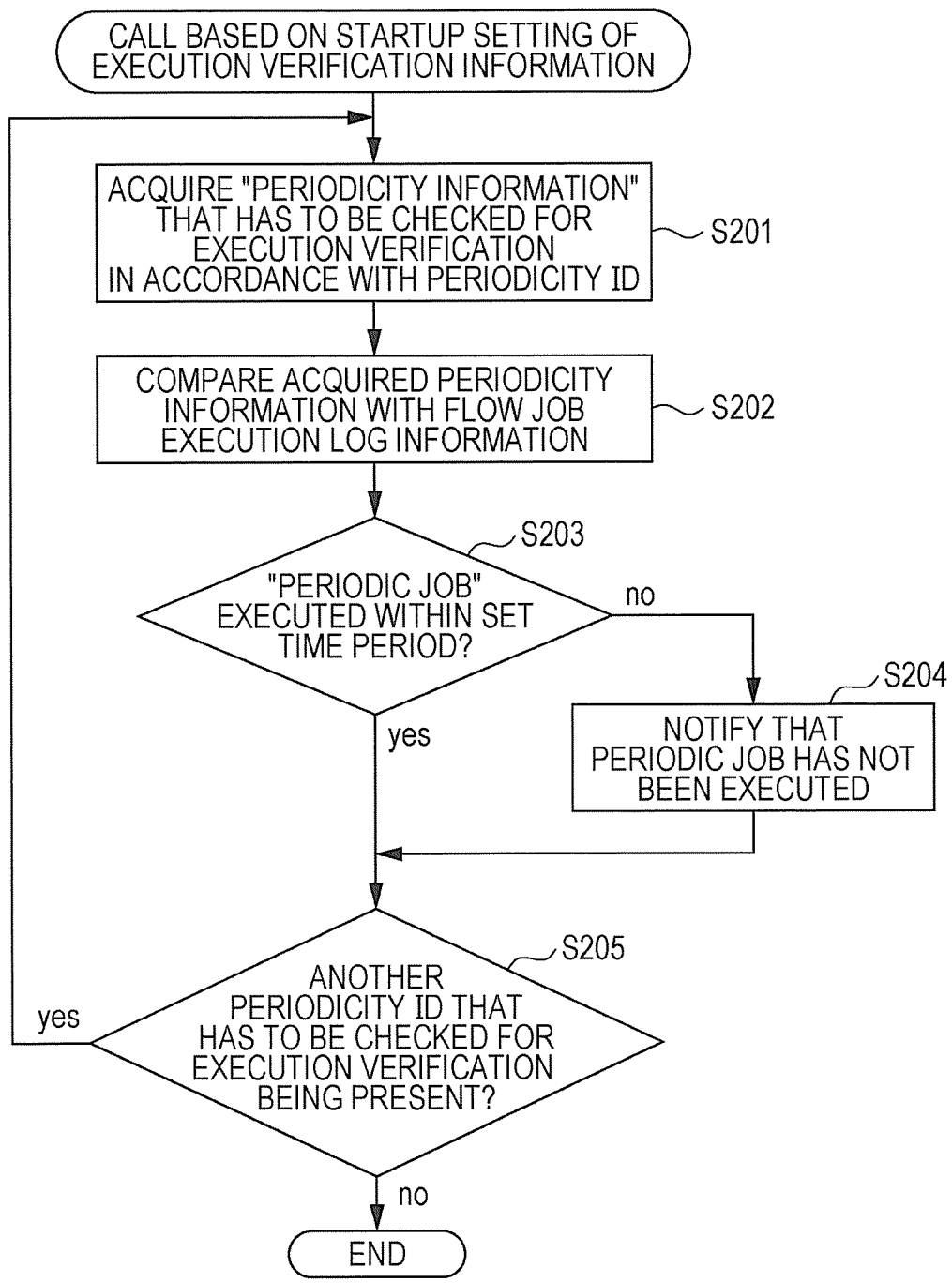
FIG. 13 is a flowchart illustrating an execution verification process of a periodic job performed by the controller.

An execution verification process of a periodic job executed by the controller 35 is described with reference to a flowchart in FIG. 13.

The controller 35 starts the execution verification process in accordance with the execution verification information in FIG. 10 when the execution verification start time set in the execution verification information has come.

In step S201, the controller 35 acquires the periodicity information that has to be checked for the execution verification in accordance with the periodicity ID set in the execution verification information.

If the current time is 17:37, the controller 35 acquires the periodicity information identified by the periodicity IDs "001", "002", and "003" and then performs the execution verification of the periodic job.

In step S202, the controller 35 compares the acquired periodicity information with the flow job execution log information.

In step S203, the controller 35 determines whether the periodic job has been executed within the time period set in the periodicity information.

If the controller 35 determines that the periodic job has not been executed within the set time period, the controller 35 instructs the notifying unit 34 to notify that the periodic job has not been executed. In step S204, the notifying unit 34 notifies in response to the notification that the periodic job has not been executed.

Figure 14:
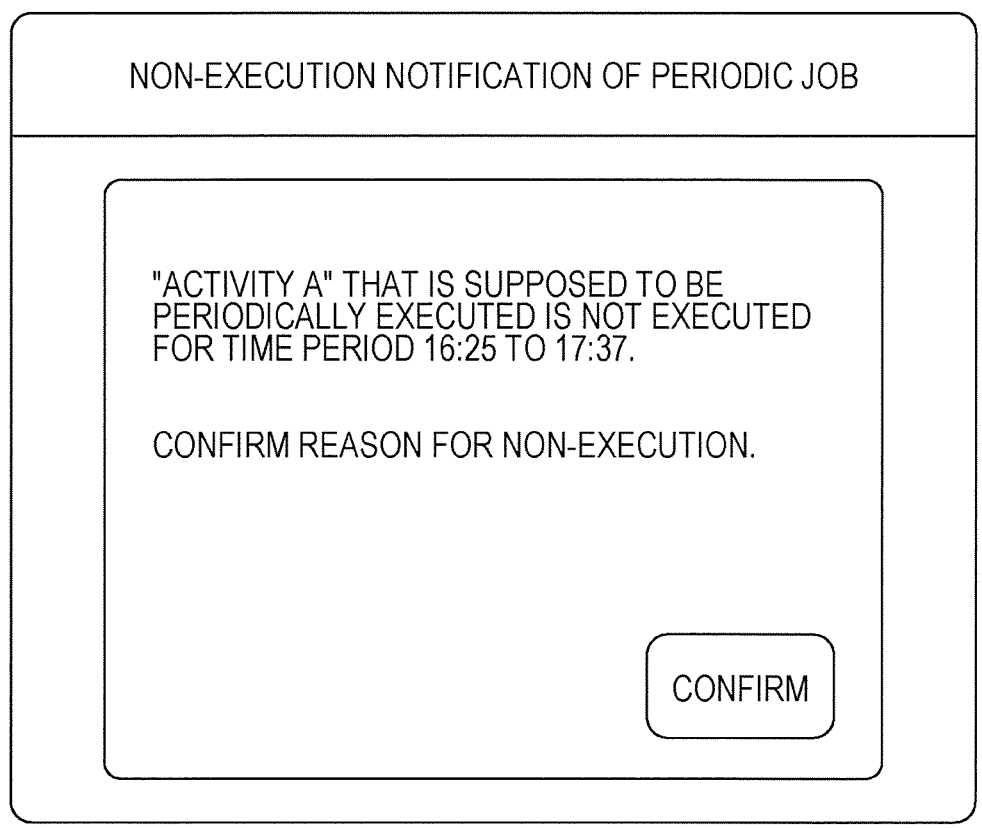
FIG. 14 illustrates an example of a non-execution notification of the periodic job performed by a notifying unit.

FIG. 14 illustrates the notification example performed by the notifying unit 34. The notification example in FIG. 14 relates to a job of "activity A". An indication that the activity A has not been executed within the time period from 16:25 to 17:37 is displayed on an operation panel of the image forming apparatus 10. Instead of displaying the indication on the display panel, the notification may be performed by sending to a predetermined destination an email telling that the periodic job has not been executed within the set time period.

If the periodic job having a given periodicity ID has been executed within the time period, the controller 35 determines in step S205 whether there is another periodicity ID that has to be checked for the execution verification.

If there is no further periodicity ID that has to be checked for the execution verification, the controller 35 ends the execution verification process. If there is another periodicity ID that has to be checked for the execution verification, the controller 35 repeats operations in steps S201 through S204.

Modifications

In accordance with the exemplary embodiment described above, the disclosure is applied to the image forming apparatus. The disclosure is not limited to the exemplary embodiment. The disclosure may be equally applied to an information processing apparatus that periodically performs a variety of processes.

Figure 15:
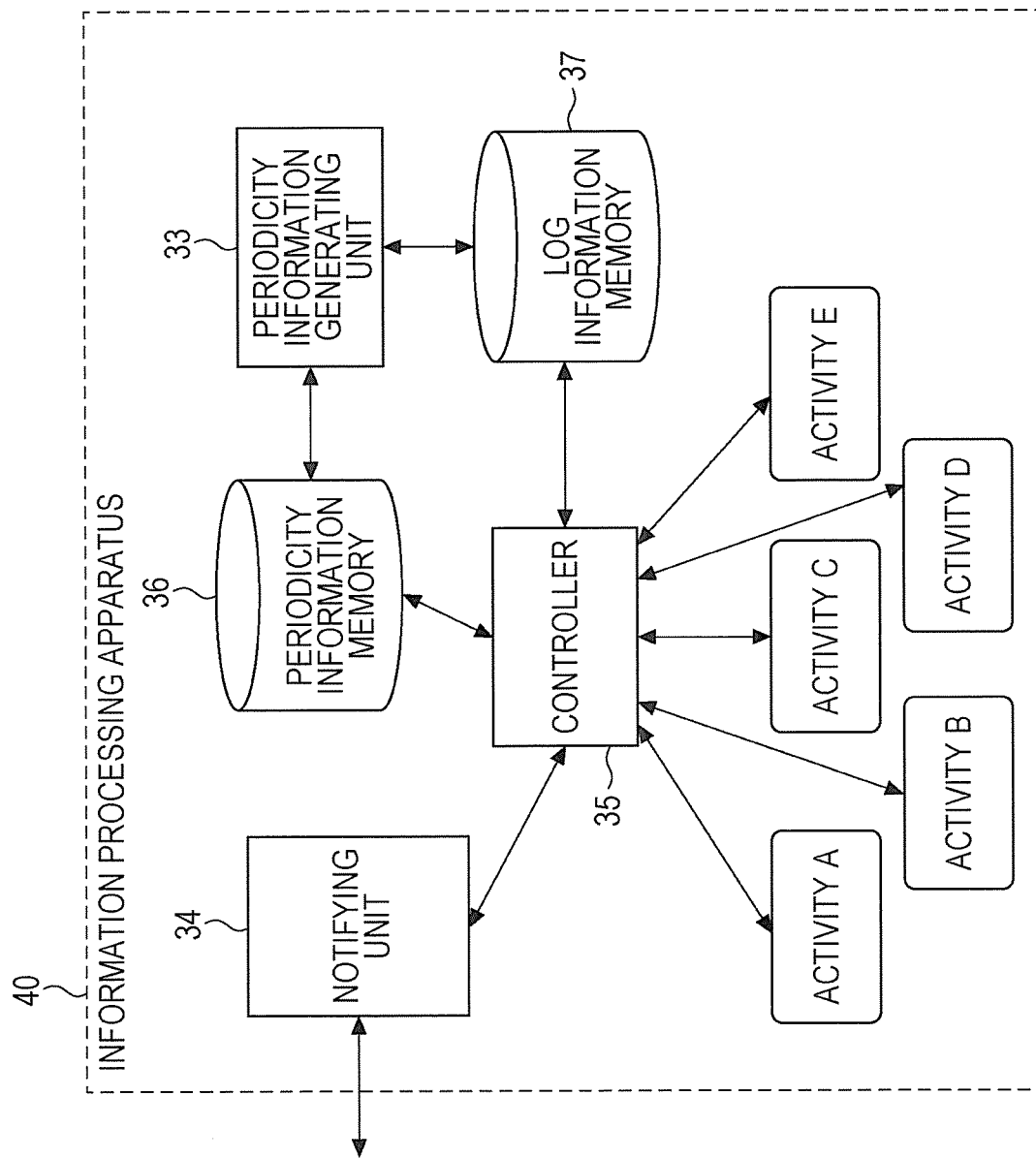
FIG. 15 is a functional block diagram illustrating an ordinary information processing apparatus to which the disclosure is applied.

FIG. 15 is a functional block diagram illustrating of a typical information processing apparatus 40 to which the disclosure is applied. Referring to FIG. 15, elements identical to those illustrated in the block diagram in FIG. 3 are designated with the same reference numerals.

Referring to FIG. 15, the information processing apparatus 40 includes a periodicity information generating unit 33, notifying unit 34, controller 35, periodicity information memory 36, and log information memory 37.

The controller 35 manages the execution of the flow job and the start and end of each activity of the flow job.

The log information memory 37 stores the flow job execution log information as the log information when the flow job is executed. The periodicity information generating unit 33 generates the periodicity information by using the log information stored on the log information memory 37. The periodicity information memory 36 stores the periodicity information generated by the periodicity information generating unit 33.

In accordance with the periodicity information stored on the periodicity information memory 36, the notifying unit 34 notifies a preset destination that an activity as a process to be monitored has not been executed within the time period set in the periodicity information if the activity has not been executed with the time period.

In a way similar to the way the exemplary embodiment described above operates, the information processing apparatus 40 notifies that the process to be monitored has not been executed within the time period during which the process is supposed to be executed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising: a memory that stores log information recording a periodical occurrence of a process to be monitored in the past; and
a processor configured to:
generate, by using the log in periodicity information that identifies a time period within which the process occurred periodically in the past by performing a statistical process on the log information stored on the memory, wherein in accordance with time and date information in the log information stored on the memory with the time and date information being on time and date on which each process has been executed, the processor generates the periodicity information by identifying a combination of at least one or more pieces of information on a time hand within which the process is to be executed, a date on which the process is to be executed, a day of week on which the process is to be executed, and an execution count of processes to be executed within the time period; and
if the process has not been executed within the time period as identified in accordance with the periodicity information, notifies that the process has not been executed.

2. The information processing apparatus according to claim 1, wherein if the process has been executed outside the time period identified by the periodicity information, the processor notifies that the process has been executed outside the time period.

3. The information processing apparatus according to claim 2, wherein the processor generates the periodicity information by performing a statistical process on the log information stored on the memory.

4. The information processing apparatus according to claim 3, wherein in accordance with time and date information in the log information stored on the memory, the time and date information being on time and date on which each process has been executed, the processor generates the periodicity information by identifying a combination of at least one or more pieces of information on a time band within which the process is to be executed, a date on which the process is to be executed, a day of week on which the process is to be executed, and an execution count of processes to be executed within the time period.

5. The information processing apparatus according to claim 4, wherein the process is a flow process throughout which a plurality of operations are sequentially performed in accordance with a predetermined sequential order.

6. The information processing apparatus according to claim 3, wherein the process is a flow process throughout which a plurality of operations are sequentially performed in accordance with a predetermined sequential order.

7. The information processing apparatus according to claim 6, wherein the processor generates the periodicity information for each of the operations forming the flow process.

8. The information processing apparatus according to claim 2, wherein the process is a flow process throughout which a plurality of operations are sequentially performed in accordance with a predetermined sequential order.

9. The information processing apparatus according to claim 8, wherein the processor generates the periodicity information for each of the operations forming the flow process.

10. The information processing apparatus according to claim 2, wherein the processor updates the periodicity information every predetermined time period in accordance with the log information stored on the memory.

11. The information processing apparatus according to claim 1, wherein the process is a flow process throughout which a plurality of operations are sequentially performed in accordance with a predetermined sequential order.

12. The information processing apparatus according to claim 11, wherein the processor generates the periodicity information for each of the operations forming the flow process.

13. The information processing apparatus according to claim 1, wherein the processor updates the periodicity information every predetermined time period in accordance with the log information stored on the memory.

14. The information processing apparatus according to claim 1, wherein if the process has not been executed until an end of the time period identified by the periodicity information, the processor notifies that the process has not been executed.

15. A non-transitory computer readable medium storing a program causing a computer to execute a process for processing information, the process comprising:
storing log information recording a periodical occurrence of a process to be monitored in the past;
generating, by using the log information, periodicity information that identifies a time period within which the process occurred periodically in the past by performing a statistical process on the log information,
in accordance with time and date information in the log information with the time and date information being on time and date on which each process has been executed, generating the periodicity information by identifying a combination of at least one or more pieces of information on a time band within which the process is to be executed, a date on which the process is to be executed, a day of week on which the process is to be executed, and an execution count of processes to be executed within the time period; and if the process has not been executed within the time period as identified in accordance with the periodicity information, notifying that the process has not been executed.

\* \* \* \* \*